B. E. DOHNER & A. J. HUFF.
ROLLER BEARING.
APPLICATION FILED DEC. 23, 1915.
1,188,632.  Patented June 27, 1916.
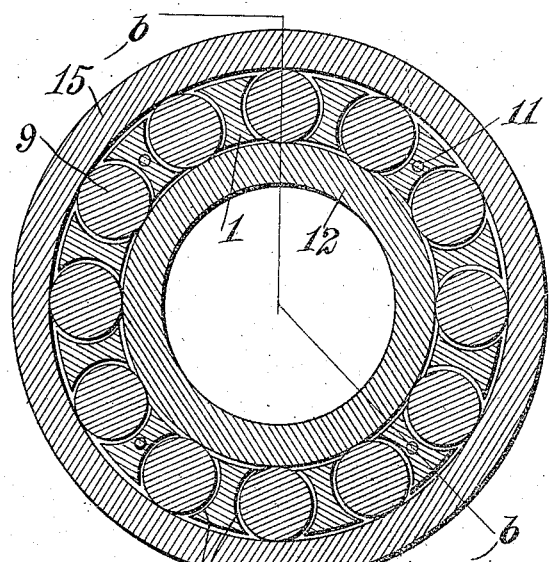
Fig. 1.
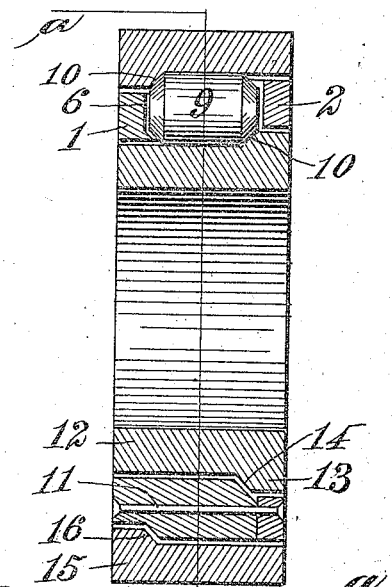
Fig. 2.
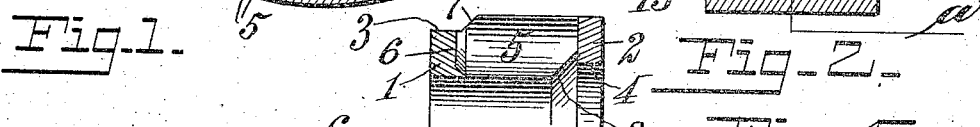
Fig. 3.   Fig. 6.   Fig. 4.
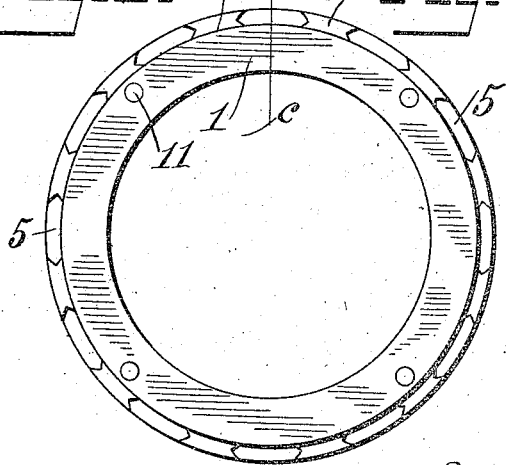
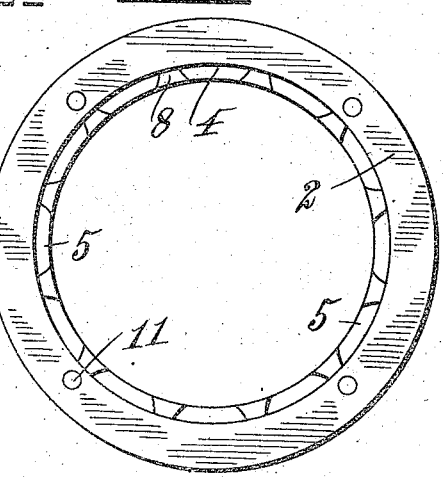
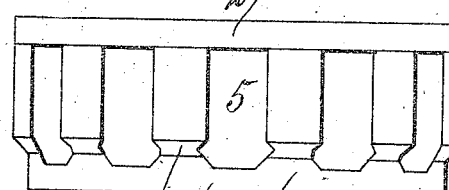
Fig. 5.
Inventors
B. E. Dohner
A. J. Huff

UNITED STATES PATENT OFFICE.

BURT E. DOHNER AND ALBERT J. HUFF, OF DAYTON, OHIO.

ROLLER-BEARING.

1,188,632.  Specification of Letters Patent.  Patented June 27, 1916.

Application filed December 23, 1915. Serial No. 68,322.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Roller-Bearings; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention comprises certain new and useful improvements in end thrust roller bearings.

The objects of the invention are several, principally among which is to provide a simple, efficient and durable roller retainer that is particularly adapted for smaller sizes of bearings such, for example, as generators for automobiles where extreme high speed is common.

In a detail description of the invention, reference is made to the accompanying drawings of which—

Figure 1 is a section on the line *a—a* of Fig. 2; Fig. 2 is a section on the line *b—b* of Fig. 1; Figs. 3 and 4 are views of opposite ends of the retainer ring; Fig. 5 is a peripheral view of the retainer ring with the rollers removed; and Fig. 6 is a section on the line *c—c* of Fig. 3.

In a detail description of the invention, similar reference characters indicate corresponding parts in the several views of the drawings and the description in connection therewith.

The retainer ring comprises two members or rings 1 and 2. The part 1 constitutes the roller cage or main ring member the outer diameter 3 of which is reduced at one end and the inner diameter 4 of which is in a similar way increased at the other end. Extending across said roller cage or main ring member 1 are a series of uniformly spaced cylindrical roller openings 5 which extend through the inner and outer surfaces thereof. The inner and outer terminals 6 of these roller openings extend into the outer and inner tapered walls 7 and 8 which lie between the outer and inner faces of the ring and into the decreased outer surface 3 and increased inner surface 4 thereof. Within the said openings 5 roller bearings 9 are caged, the said rollers being of elongated form and terminating at their ends in tapered or end thrust surfaces 10. The ring 2 is united to the ring 1 by means of pins 11, or in any other suitable manner. When so united the said ring 11 closes the openings on one side of the ring.

12 designates an inner shell within the cage having one end 13 of increased diameter to provide an annular tapered surface 14 which engages the end thrust surfaces 10 of the rollers at one end. 15 is an outer shell inclosing the roller cage and having a similar tapered surface 16 that engages the end thrust surfaces 10 on the other end of said rollers.

Having described our invention, we claim—

1. A roller bearing, comprising an annular retaining member having a series of roller openings therein and the outer and inner diameters of which are increased and decreased at opposite ends and into which increased and decreased portions of said retaining member the said roller openings extend, a series of rollers mounted in said openings, an inner shell engaged by said rollers, and an outer shell receiving said retaining members and engaging said rollers, substantially as specified.

2. In a bearing of the type specified, a retaining ring the outer diameter of which is reduced at one end and the inner diameter of which is increased at the other end, the said ring having openings which communicate with said decreased and increased diameters, rollers mounted in said openings having end thrust surfaces, the inner and outer surfaces of said rollers being exposed through said openings and the end thrust surfaces thereof being exposed through the ends of said openings at the reduced and increased diameters of the ring.

3. In a roller bearing, a cylindrical retaining ring one end of which is provided with an outer reduced portion and the other end of which is provided with an inner reduced portion, said retaining ring having roller openings, rollers mounted in said openings and having end thrust surfaces, and inner and outer shells, said shells having oppositely disposed tapered surfaces adapted to engage the end thrust surfaces of said rollers, the reduced portions of the retaining ring being adapted to receive said tapered surfaces, substantially as specified.

4. In a roller bearing, a retaining ring the ends of which terminate in inner and outer tapered surfaces, said ring having roller openings extending into said tapered surfaces having end thrust surfaces, rollers mounted in said openings, the inner and outer surfaces of which project through said openings, and end thrust surfaces of which project through the openings in said inner and outer surfaces, a ring attached to said retaining ring and inclosing said rollers at one end, and inner and outer shells having tapered surfaces on the exterior and interior of said retaining ring, said tapered surfaces engaging the end thrust surfaces of the rollers.

In testimony whereof we affix our signatures.

BURT E. DOHNER.
ALBERT J. HUFF.

Copies of this patent may be obtained for five cents each, by addressing the "Commissioner of Patents, Washington, D. C."